Figure 1:
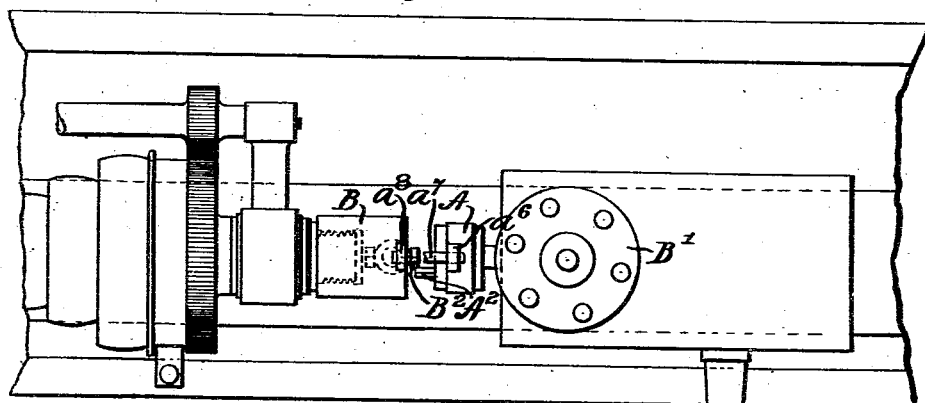

No. 633,108.　　　　　　　　　　　　　Patented Sept. 12, 1899.
W. B. PEARSON.
MACHINE FOR TURNING REGULAR HEXAGONS.
(Application filed Jan. 4, 1898.)

(No Model.)　　　　　　　　　　　　　　　　　2 Sheets—Sheet 1.

WITNESSES:　　　　　　　　　　　　　　　INVENTOR
Byron B. Carter　　　　　　　　　　　　　Walter B. Pearson,
Clara Corwin　　　　　　　　　　　　　BY Jno. E. Waldo.
　　　　　　　　　　　　　　　　　　　his ATTORNEY.

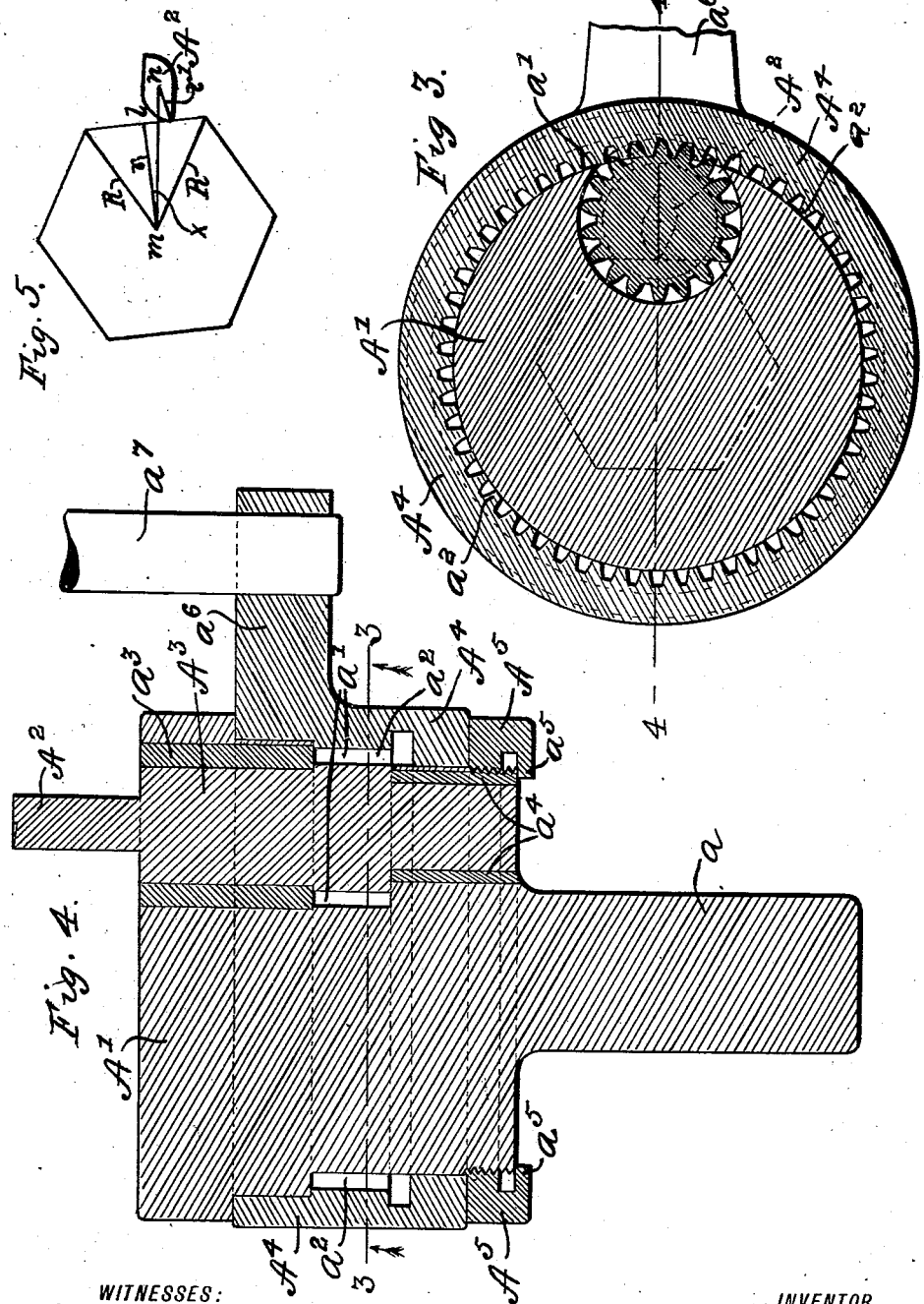

UNITED STATES PATENT OFFICE.

WALTER B. PEARSON, OF CHICAGO, ILLINOIS.

MACHINE FOR TURNING REGULAR HEXAGONS.

SPECIFICATION forming part of Letters Patent No. 633,108, dated September 12, 1899.

Application filed January 4, 1898. Serial No. 665,569. (No model.)

*To all whom it may concern:*

Be it known that I, WALTER B. PEARSON, a citizen of the United States, and a resident of Chicago, in the county of Cook and State of Illinois, have invented an Improved Tool or Mechanism for Cutting or Turning Regular Hexagons, of which the following is a specification.

This invention relates to an improved tool or mechanism for cutting or turning regular hexagons, and relates particularly to an improved tool or mechanism for this purpose of the general type, comprising a rotary cutter supported eccentrically to the center of the work or polygon to be cut, to which rotary movement relatively to the work is imparted either by revolving the cutter about the work or by revolving the work upon its own axis or otherwise.

My ultimate object has been to provide a tool or mechanism of this general type in which the cutter has a uniform angular velocity both upon its own axis and also relatively to the work and which will cut a regular hexagonal figure or shape the sides of which are for all practical purposes straight.

I am aware that tools or mechanisms of this general type are old in the art, and I do not therefore claim the same broadly. I refer to the lathe attachment heretofore patented to C. G. Dahlgren and J. H. Swenson by Letters Patent of the United States No. 469,813, dated March 1, 1892. This patent, however, expressly states that the sides of a polygon turned in a lathe equipped with said attachment will be either concave or convex, and there is no disclosure which would enable even the most skilled mechanic to construct a tool or mechanism of this general type that would cut a polygon the sides of which would be straight, or substantially so. Thus to cut a substantially straight-sided polygon in this manner formed no part of and was entirely beyond their conception, and they were obviously ignorant of the elements and conditions necessary to produce such a polygon.

A tool or mechanism embodying my present invention comprises a rotary cutter having two cutting-points located at one hundred and eighty degrees from each other, the axis of said cutter being located at a definite fixed distance from the center of the work and said cutter having a definite fixed dimension from its axis to the cutting-points, both said distance between the axis of the cutter and the center of the work and the dimension of the cutter from its axis to the cutting-points being expressed as functions of a known dimension of the hexagon.

A tool or mechanism embodying my invention also comprises means to impart rotary movement to the cutter upon its axis with a uniform angular velocity and also to impart relative rotary movement to said cutter and work, the angular velocity of the cutter upon its axis being three times the relative velocity of said cutter and work.

In the accompanying drawings a mechanism of my invention is fully illustrated, said invention being shown as embodied in a tool adapted for use in a turret-lathe.

Figure 2:
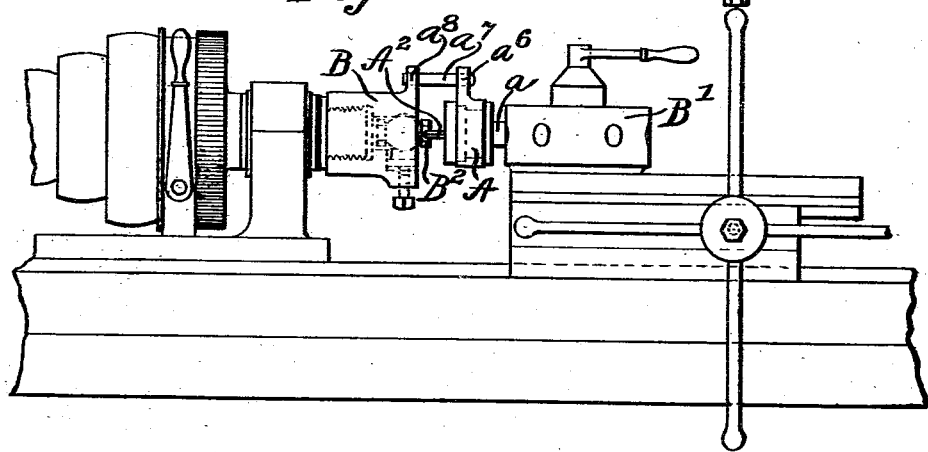

Figure 1 is a top plan view of a portion of a turret-lathe, showing a tool embodying my invention in operative position therein. Fig. 2 is a side view of the parts shown in Fig. 1. Fig. 3 is a sectional view of a tool embodying my invention, taken on the line 3 3 of Fig. 4, the hexagon to be cut being shown in diagram. Fig. 4 is a sectional view thereof on the line 4 4 of Fig. 3, and Fig. 5 is a diagrammatic view for the purpose of more conveniently defining certain quantities and dimensions.

A tool or mechanism of my invention admits of embodiment in different forms. Among other forms a tool or mechanism of my invention admits of embodiment in a tool adapted for use in a turret-lathe, and for purposes of illustration I have in the drawings shown my improvements as embodied in a tool of this kind.

Referring now to the drawings, A designates as a whole a tool embodying my invention; B, Figs. 1 and 2, a chuck carried on the spindle of a turret-lathe; B', the turret-head of the lathe, and B² a globe-valve secured in said chuck, on the outer end of which the tool A is turning a regular hexagon, said hexagon being also indicated in diagram in Fig. 3.

In the preferable construction shown the tool A comprises a rigid body portion A', having a shank $a$, by means of which said tool is secured in the turret-head B' of the lathe in fixed operative position relatively to the work.

Revolubly supported upon the body portion A' of the tool, eccentrically to the center thereof, is a cutter A², to which a uniform rotary motion upon its own axis is imparted by suitable means. As shown, the cutter A² is carried on a shaft or shank A³, revolubly mounted in a suitable bearing formed in said body portion A' of the tool. Secured to the shaft or shank A³, within a recess formed in the body portion A' of the tool adapted to receive it, is a pinion a', which meshes with an internal gear a², formed on a ring or collar A⁴, revolubly mounted upon a suitable bearing formed on the body portion A' of the tool concentric therewith. It is obvious that rotation of the ring or collar A⁴ will impart rotary movement to the shaft or shank A³ and to the cutter A², carried thereon about the axis of said shaft or shank. The bearings for the shaft or shank A³ are preferably bushed. The outside diameter of the bushing a³ at the front end of said bearing is greater than the diameter of the pinion a', and the outside diameter of the bushing a⁴ at the rear end of said bearing is less than the diameter of said pinion a' at the bottom of the teeth. By this construction provision is made for conveniently assembling said tool, while the rear side of the pinion a' will rest in contact with the body portion A' of the tool, which will thus receive the thrust due to the operation of the cutter A², all in a desirable manner. The ring or collar A⁴ is secured in position upon its bearing by a nut A⁵, threaded to the rear end of the body portion A' of the tool. To prevent the nut A⁵ from binding upon the ring or collar A⁴, said nut is provided with an inwardly-projecting flange a⁵, which is adapted to come into contact with the rear face of the body portion A' of the tool when said nut is in proper position relatively to the said ring or collar.

Any suitable means may be used to drive the ring or collar A⁴. When possible, however, I prefer to drive said ring by means of positive connection between said ring and the spindle of the machine. Convenient means for this purpose are as follows: Rigidly secured to said ring or collar A⁴ is an arm a⁶, in which is secured a rod a⁷, which projects forward over the work and is brought into positive engagement with a rigid arm a⁸ on the chuck B by advancing the cutter A² toward the work, the relation and adjustment being such that said rod a⁷ will be brought into engagement with the arm a⁸ before the cutter reaches the work. As shown, the rod a⁷ enters a suitable hole in the arm a⁸. When driven in this manner, the axis of rotation of the ring or collar A⁴ is in alinement with the axis of rotation of the work. With this construction it is obvious that both the work and the cutter will rotate with uniform angular velocities upon their respective axes.

Whatever its specific form or embodiment may be, a tool or mechanism of my invention comprises certain relative dimensions and movements which are necessarily constant in any given case and are calculable from universal formulæ. These dimensions and movements are the following: the distance between the axes of the work and of the cutter, the distance from the axis of the cutter to its cutting-points, and the angular velocity of the cutter upon its own axis relatively to the relative angular velocity of the work and cutter. I will now give the formulæ for deducing these variable dimensions, the expressions used being defined as follows: $N$ = the number of sides of the polygon = 6; $n$ = the number of cutting-points of the cutter = 2; $\frac{N}{n}$ = the angular velocity of the cutter upon its own axis relatively to the relative angular velocity of the work and cutter = 3; $R$ = the long radius of the polygon—that is, the radius of a circle circumscribed about said polygon; $r$ = the short radius of the polygon—that is, the radius of a circle inscribed in said polygon; $r'$ = the dimension of the cutter from its axis to its cutting-points; $m\,n$ = the distance between the axes of the work and of the cutter = $r + r'$, and $x$ = the angle between a line which bisects the side of the polygon on which the cutter is working, and hence the angle subtended thereby, and a right line joining the axes of the work and cutter or the angle $l\,m\,n$ in Fig. 5 of the drawings. Given the foregoing values and assuming that it is possible to cut a straight-sided hexagon with said tool, then $$(A)\quad r' = \frac{r(\sec x - 1)}{1 - \cos\frac{N}{n}x - \sin\frac{N}{n}x\tan x},$$

or, more specifically, $$(B)\quad r' = \frac{r(\sec x - 1)}{1 - \cos 3x - \sin 3x \tan x}.$$

It is possible graphically to ascertain very approximately the maximum value of $x$—that is, the value of $x$ at which the cutter cuts in or out of a given side which will be at an angle of the polygon—and by substituting for $x$ in the above formula an angle less than said maximum value of $x$ the value of $r'$ may be derived. It is obvious that if said tool cuts a straight-sided figure $r'$, and hence the formula for the value thereof must be a constant for all values of $x$ less than the maximum value thereof, a trigonometric expression for the maximum value of $x$ is the following:

$$(C)\quad x = \frac{180°}{N} - \sin^{-1}\frac{\sqrt{R^2 - \left[\frac{(r+r')^2 + R^2 - r'^2}{2(r+r')}\right]^2}}{R},$$

in which equation "sin. ⁻¹" signifies "the angle whose sine is." By substituting for $x$ in formula B for $r'$ different values less than the maximum value thereof I find that $r'$ is constant for all practical purposes, and hence that a tool of this character with the values of $r'$ and of $mn$ derived according to said formula B will cut a practically straight-sided hexagon. By way of caution I will say that it is desirable to carry out all trigonometric function and all decimals to six places.

In order to better illustrate the application of the formula in practice, I will now derive the values of $r'$ and of $mn$ necessary to turn a given hexagon. Assume $r = 1''$ and $x = 8°$, substituting in the formula for $r'$, $$r' = \frac{r \sec. 8° - r}{1 - \cos. 24° - \sin. 24° \tan. 8°},$$

or $$r' = \frac{.0098}{1 - .91355 - .40674 \times .14054} = .33458'',$$

and $mn = r + r' = 1.33458''$, and substituting in formula C the maximum value of $x = 16° - 57'$.

The cutter is to be set relatively to the work, as shown in Fig. 3 of the drawings.

I claim—

1. In a tool or mechanism for turning regular polygonal shapes or figures, the combination of a rotary cutter of which the dimension $$r' = \frac{r \sec. x - r}{1 - \cos. \frac{N}{n} x - \sin. \frac{N}{n} x \tan. x},$$

the axis of said cutter being located eccentrically to the center of the shape or figure to be cut and at a distance therefrom equal to $r + r'$, means to impart relative rotary movement to said cutter and to the shape or figure to be cut and means to rotate said cutter upon its axis with a uniform angular velocity relatively to the relative angular movement of the shape or figure to be cut and the cutter, the angular velocity of the shape or figure to be cut and the cutter being to the angular velocity of the cutter upon its axis as one to $\frac{N}{n}$, substantially as described.

2. In a tool or mechanism for turning regular hexagonal shapes or figures, the combination of a two-pointed rotary cutter, of which the dimension $$r' = \frac{r (\sec. x - 1)}{1 - \cos. 3x - \sin. 3x \tan. x},$$

the axis of said cutter being located eccentrically to the center of the hexagon to be cut and at a distance therefrom equal to $r + r'$, means to impart relative rotary movement to said cutter and to the hexagonal figure to be cut and means to rotate said cutter upon its axis with a uniform angular velocity relatively to the relative angular movement of the hexagon to be cut and the cutter, the angular velocity of the hexagon to be cut and the cutter, being to the angular velocity of the cutter upon its axis as one to three, substantially as described.

3. In a tool or mechanism for cutting regular polygonal figures, the combination of a rotary cutter of which the dimension $$r' = \frac{r (\sec. x - 1)}{1 - \cos. \frac{N}{n} x - \sin. \frac{N}{n} x \tan. x},$$

the axis of rotation of said cutter being located eccentrically to the center of the shape or figure to be cut and at a distance therefrom equal to $r + r'$, means to impart a uniform relative rotary movement to said cutter and to the shape or figure to be cut and means to rotate said cutter upon its axis with a uniform angular velocity, the angular velocity of the work and cutter being to the angular velocity of the cutter upon its axis as one to $\frac{N}{n}$, substantially as described.

4. In a tool or mechanism for cutting regular hexagonal shapes or figures, the combination of a two-pointed, rotary cutter, of which the dimension $$r' = \frac{r (\sec. x - 1)}{1 - \cos. 3x - \sin. 3x \tan. x},$$

the axis of rotation of said cutter being located eccentrically to the center of the hexagon to be cut and at a distance therefrom equal to $r + r'$, means to impart a uniform relative rotary movement to said cutter and to the hexagon to be cut and means to rotate said cutter upon its axis with a uniform angular velocity, the angular velocity of the work and cutter being to the angular velocity of the cutter upon its axis as one to three, substantially as described.

5. In a tool or mechanism for cutting regular polygonal figures, the combination of a rotary spindle supported in fixed bearings on which the shape or figure to be cut is carried concentrically with the axis of rotation thereof, a rotary cutter, of which the dimension $$r' = \frac{r (\sec. x - 1)}{1 - \cos. \frac{N}{n} x - \sin. \frac{N}{n} x \tan. x},$$

the axis of rotation of said cutter, being located eccentrically to the axis of rotation of the work-carrying spindle and at a distance therefrom equal to $r + r'$, means to rotate both the work-carrying spindle and the cutter upon their own axes with uniform angular velocities, respectively, the angular velocity of the work-carrying spindle being to the angular velocity of the cutter as one to $\frac{N}{n}$, substantially as described.

6. In a tool or mechanism for cutting regular hexagons, the combination of a rotary spindle supported in fixed bearings on which the hexagon to be cut is carried concentrically with the axis of rotation thereof, a two-pointed, rotary cutter, of which the dimension $$r' = \frac{r(\sec. x - 1)}{1 - \cos. 3x - \sin. 3x \tan. x},$$

the axis of rotation of said cutter being located eccentrically to the axis of rotation of the work-carrying spindle and at a distance therefrom equal to $r + r'$, means to rotate both the work-carrying spindle and the cutter upon their own axes with uniform angular velocities, respectively, the angular velocity of the work-carrying spindle being to the angular velocity of the cutter as one to three, substantially as described.

7. In a tool or mechanism for cutting regular polygonal shapes or figures, the combination of a spindle, revolubly supported in fixed bearings, on which the shape or figure to be cut is carried, concentrically with the axis of rotation thereof, a rotary cutter, of which the dimension $$r' = \frac{r(\sec. x - 1)}{1 - \cos. \frac{N}{n} x - \sin. \frac{N}{n} x \tan. x},$$

the axis of rotation of said cutter being located eccentrically to the axis of rotation of said spindle and at a distance therefrom equal to $r + r'$, means to rotate said work-carrying spindle and driving connection between said spindle and cutter whereby rotary movement of said spindle will impart rotary movement to said cutter, the relation of parts being such that the angular velocity of the spindle will be to the angular velocity of the cutter as one to $\frac{N}{n}$, substantially as described.

8. In a tool or mechanism for cutting regular hexagons, the combination of a spindle, revolubly supported in fixed bearings, on which the hexagon to be cut is carried concentrically with the axis of rotation thereof, a two-pointed rotary cutter of which the dimension $$r' = \frac{r(\sec. x - 1)}{1 - \cos. 3x - \sin. 3x \tan. x},$$

the axis of rotation of said cutter being located eccentrically to the axis of rotation of said spindle and at a distance therefrom equal to $r + r'$, means to rotate said work-carrying spindle and driving connection between said spindle and cutter whereby rotary movement of said spindle will impart rotary movement to said cutter, the relation of parts being such that the angular velocity of the spindle will be to the angular velocity of the cutter as one to three, substantially as described.

9. In a machine for turning regular polygonal shapes or figures, the combination of a spindle, revolubly supported in stationary bearings, on which the shape or figure to be cut is carried concentrically with the axis of rotation thereof, a rigid support located opposite to the end of said spindle, a rotary cutter, of which the dimension $$r' = \frac{r(\sec. x - 1)}{1 - \cos. \frac{N}{n} x - \sin. \frac{N}{n} x \tan. x},$$

mounted in said support so that its axis of rotation is eccentric to the axis of rotation of the work-carrying spindle and at a distance therefrom equal to $r + r'$ and means to rotate both said spindle and cutter with uniform angular velocities, respectively, the angular velocity of the spindle being to the angular velocity of the cutter as one to $\frac{N}{n}$, the means for rotating the cutter comprising a band or collar fitted to and revoluble upon a suitable bearing formed on the cutter-support, a regular internal gear on which meshes with a regular pinion secured to the shank of the cutter, substantially as described.

10. In a machine for turning regular hexagonal shapes, the combination of a spindle, revolubly supported in stationary bearings, on which the hexagon to be cut is carried, concentrically with the axis of rotation thereof, a rigid support located opposite to the end of said spindle, a two-pointed rotary cutter, of which the dimension $$r' = \frac{r(\sec. x - 1)}{1 - \cos. 3x - \sin. 3x \tan. x},$$

mounted in said support so that its axis of rotation is eccentric to the axis of rotation of the work-carrying spindle and at a distance therefrom equal to $r + r'$ and means to rotate both said spindle and cutter with uniform angular velocities, respectively, the angular velocity of the spindle being to the angular velocity of the cutter as one to three, the means for rotating the cutter comprising a band or collar fitted to and revoluble upon a suitable bearing formed on the cutter-support, a regular internal gear on which meshes with a regular pinion secured to the shank of the cutter, substantially as described.

11. In a machine for turning regular polygonal shapes or figures, the combination of a spindle revolubly supported in stationary bearings, on which the shape or figure to be turned is carried concentrically with the axis of rotation thereof, a rigid support located opposite to the end of said spindle, a rotary cutter, of which the dimension $$r' = \frac{r(\sec. x - 1)}{1 - \cos. \frac{N}{n} x - \sin. \frac{N}{n} x \tan. x},$$

mounted in a suitable bearing in said support so that its axis of rotation is eccentric to the axis of rotation of the work-carrying spindle and at a distance therefrom equal to $r + r'$, means to rotate said spindle, a band or collar fitted to and revoluble upon a suitable bearing formed on said cutter-support, a regular internal gear formed on said band or collar which meshes with a regular pinion secured to the shank of the cutter and an arm on said band or collar which projects into the path of travel of an arm rigidly connected to the work-carrying spindle, the relation of parts being such that the angular velocity of the spindle is to the angular velocity of the cutter as one to $\frac{N}{n}$, substantially as described.

12. In a machine for turning regular hexagonal shapes, the combination of a spindle revolubly mounted in stationary bearings, on which the hexagon to be turned is carried concentrically with the axis of rotation thereof, a rigid support located opposite to the end of said spindle, a two-pointed rotary cutter, of which the dimension $$r' = \frac{r(\sec. x - 1)}{1 - \cos. 3x - \sin. 3x \tan. x},$$

mounted in a suitable bearing in said support so that its axis of rotation is eccentric to the axis of rotation of the work-carrying spindle and at a distance therefrom equal to $r + r'$, means to rotate said spindle, a band or collar fitted to and revoluble upon a suitable bearing formed on said cutter-support, a regular internal gear formed on said band or collar, which meshes with a regular pinion secured to the shank of the cutter and an arm on said band or collar which is adapted to be brought into positive engagement with an arm rigidly attached to the work-carrying spindle, the relation of parts being such that the angular velocity of the spindle is to the angular velocity of the cutter as one to three, substantially as described.

13. In a turret-lathe tool for cutting regular polygonal shapes or figures, the combination of a body portion, a shank thereon whereby said tool may be secured in the turret-head, a rotary cutter mounted in a suitable bearing formed in said body portion of the tool, of which the dimension $$r' = \frac{r(\sec. x - 1)}{1 - \cos. \frac{N}{n} x - \sin. \frac{N}{n} x \tan. x},$$

a ring or collar fitted to and revoluble upon a suitable bearing formed on the body portion of said tool and which is concentric with the axis of rotation of the lathe-spindle when said tool is in operative position and the distance between the center of the bearing of said ring and the axis of rotation of the cutter being equal to $r + r'$, a regular internal gear formed on said ring which meshes with a regular pinion secured to the shank of the cutter and an arm on said ring which projects into the path of travel of a rigid attachment to the spindle of the lathe, and the relation of parts being such that the angular velocity of the spindle will be to that of the cutter as one to $\frac{N}{n}$, substantially as described.

14. In a turret-lathe tool for turning regular hexagonal shapes, the combination of a body portion, a shank thereon whereby said tool may be secured in the turret-head, a two-pointed rotary cutter mounted in a suitable bearing formed in said body portion of the tool, of which the dimension $$r' = \frac{r(\sec. x - 1)}{1 - \cos. 3x - \sin. 3x \tan. x},$$

a ring or collar fitted to and revoluble upon a suitable bearing formed on the body portion of said tool and which is concentric with the axis of rotation of the lathe-spindle, when said tool is in operative position and the distance between the center of the bearing of said ring and the axis of said cutter being equal to $r + r'$, a regular internal gear formed on said ring or collar, which meshes with a regular pinion secured to the shank of the cutter and an arm on said ring which is adapted to be brought into positive engagement with an arm rigidly attached to the lathe-spindle and the relation of parts being such that the angular velocity of the spindle will be to the angular velocity of the cutter as one to three, substantially as described.

15. In a machine for turning polygonal figures, the combination of a spindle revolubly supported in stationary bearings on which the shape or figure to be cut is carried, a rigid support located opposite to the end of said spindle, a rotary cutter mounted in said support so that its axis of rotation is eccentric to the axis of rotation of the work-carrying spindle and means to rotate both said spindle and cutter upon their own axes, substantially as described.

16. In a machine for turning polygonal figures, the combination of a spindle revolubly supported in suitable bearings, a support located opposite to the end of said spindle, a rotary cutter mounted in said support, so that its axis of rotation is eccentric to the axis of rotation of the spindle, means to rotate said spindle and driving connection between said spindle and cutter whereby rotary movement of said spindle will impart rotary movement to said cutter, substantially as described.

17. In a machine for turning polygonal figures or shapes, the combination of a spindle revolubly supported in stationary bearings, a support located opposite to the end of said spindle, a rotary cutter mounted in said support so that its axis of rotation is eccentric to the axis of rotation of the spindle, means to rotate said spindle and cutter, the means for rotating said cutter comprising a band or collar fitted to and revoluble upon a suitable bearing formed on the cutter-support, an internal gear on which engages with a pinion secured to the shank of the cutter, substantially as described.

18. In a machine for turning polygonal shapes or figures, the combination of a spindle revolubly supported in stationary bearings, a support located opposite to the end of said spindle, a rotary cutter mounted in said support so that its axis of rotation is eccentric to the axis of rotation of said spindle, means to rotate said spindle, a band or collar fitted to and revoluble upon a suitable bearing formed on said cutter-support, an internal gear on which meshes with a pinion secured to the shank of the cutter and an arm on said band or collar which projects into the path of travel of an arm rigidly connected to the work-carrying spindle, substantially as described.

19. In a turret-lathe tool, the combination of a body portion, a shank thereon by which said tool may be secured in the turret-head, a rotary cutter mounted in suitable bearings formed in said body portion of the tool, a ring or collar fitted to and revoluble upon a suitable bearing formed on the body portion of said tool, an internal gear formed on said ring or collar which engages a pinion on the shank of the cutter, and an arm on said ring or collar, substantially as described.

In testimony that I claim the foregoing as my invention I have hereunto set my hand this 5th day of October, 1897.

WALTER B. PEARSON.

Witnesses:
 LEVI CLARK,
 BYRON B. CARTER.